(12) United States Patent
Stihler et al.

(10) Patent No.: US 10,490,969 B2
(45) Date of Patent: Nov. 26, 2019

(54) ACTIVE STABILIZATION OF MODE INSTABILITIES IN OPTICAL WAVEGUIDES

(71) Applicants: Fraunhofer-Gesellschaft zur Foerderung der angewandten Forschung e. V., Munich (DE); Friedrich-Schiller-Universitaet Jena, Jena (DE)

(72) Inventors: Christoph Stihler, Jena (DE); César Jáuregui Misas, Jena (DE); Jens Limpert, Jena (DE); Hans-Juergen Otto, Jena (DE); Andreas Tuennermann, Weimar (DE); Fabian Stutzki, Jena (DE)

(73) Assignees: Fraunhofer-Gesellschaft zur Foerderung der angewandten Forschung e. V., Munich (DE); Friedrich-Schiller-Universitaet Jena, Jena (DE)

( * ) Notice: Subject to any disclaimer, the term of this patent is extended or adjusted under 35 U.S.C. 154(b) by 33 days.

(21) Appl. No.: 15/649,754

(22) Filed: Jul. 14, 2017

(65) Prior Publication Data
US 2018/0019566 A1    Jan. 18, 2018

Related U.S. Application Data

(60) Provisional application No. 62/362,683, filed on Jul. 15, 2016.

(51) Int. Cl.
| | | |
|---|---|---|
| *H01S 3/13* | (2006.01) | |
| *G02F 1/365* | (2006.01) | |
| *H01S 3/067* | (2006.01) | |
| *H01S 3/094* | (2006.01) | |
| *H01S 3/10* | (2006.01) | |

(52) U.S. Cl.
CPC ............ *H01S 3/1306* (2013.01); *G02F 1/365* (2013.01); *H01S 3/06762* (2013.01); *H01S 3/094003* (2013.01); *H01S 3/10015* (2013.01); *H01S 3/1305* (2013.01)

(58) Field of Classification Search
None
See application file for complete search history.

(56) References Cited

U.S. PATENT DOCUMENTS

| | | | |
|---|---|---|---|
| 6,693,848 B1 * | 2/2004 | Ambs | ............. G01H 9/00 367/149 |
| 2011/0206074 A1 * | 8/2011 | Durkin | ............. G02B 6/024 372/25 |
| 2011/0216790 A1 | 9/2011 | Durkin et al. | |

(Continued)

OTHER PUBLICATIONS

Otto et al. ("Controlling mode instabilities by dynamic mode excitation with an acousto-optic deflector", Optics Express, vol. 21, No. 14, Jul. 15, 2013, pp. 17285-17298).*

(Continued)

*Primary Examiner* — Chad H Smith
(74) *Attorney, Agent, or Firm* — Collard & Roe, P.C.

(57) ABSTRACT

A method of propagating a laser signal through an optical waveguide and a waveguide laser system provide a novel way of stabilizing the beam emitted by a fiber laser system above the mode instability threshold wherein the beat length of two or more interfering transverse modes of the laser signal in the optical waveguide is modulated in time.

13 Claims, 4 Drawing Sheets

(56) References Cited

U.S. PATENT DOCUMENTS

2013/0107351 A1* 5/2013 Clowes ............... H01S 3/06758
359/341.3
2015/0063767 A1 3/2015 Jáuregui Misas et al.

OTHER PUBLICATIONS

D. J. Richardson, J. Nilsson, and W. A. Clarkson, "High power fiber lasers: current status and future perspectives [Invited]," J. Opt. Soc. Am. B, vol. 27, No. 11, Nov. 2010, pp. B63-B92. http://www.opticsinfobase.org/abstract.cfm?URI=josab-27-11-B63.

F. Stutzki, F. Jansen, T. Eidam, A. Steinmetz, C. Jauregui, J. Limpert, and A. Tünnermann, "High average power large-pitch fiber amplifier with robust single-mode operation," Optics Letters, vol. 36, No. 5, Mar. 1, 2011, pp. 689-691. http://www.opticsinfobase.org/abstract.cfm?URI=ol-36-5-689.

C. Liu, G. Chang, N. Litchinitser, A. Galvanauskas, D. Guertin, N. Jabobson, and K. Tankala, "Effectively Single-Mode Chirally-Coupled Core Fiber," in Advanced Solid-State Photonics, OSA Technical Digest Series (CD) (Optical Society of America, 2007), paper ME2, total of 3 pages. http://www.opticsinfobase.org/abstract.cfm?URI=ASSP-2007-ME2.

F. Jansen, F. Stutzki, H.-J. Otto, T. Eidam, A. Liem, C. Jauregui, J. Limpert, and A. Tünnermann, "Thermally induced waveguide changes in active fibers," Optics Express, vol. 20, No. 4, Feb. 13, 2012, pp. 3997-4008. http://www.opticsinfobase.org/oe/abstract.cfm?URI=oe-20-4-3997.

T. Eidam, S. Hanf, E. Seise, T.V. Andersen, T. Gabler, C. Wirth, T. Schreiber, J. Limpert, and A. Tünnermann, "Femtosecond fiber CPA system emitting 830 W average output power," Optics Letters, vol. 35, No. 2, Jan. 15, 2010, pp. 94-96. http://www.opticsinfobase.org/abstract.cfm?URI=ol-35-2-94.

T. Eidam, C. Wirth, C. Jauregui, F. Stutzki, F. Jansen, H.-J. Otto, O. Schmidt, T. Schreiber, J. Limpert, and A. Tünnermann, "Experimental observations of the threshold-like onset of mode instabilities in high power fiber amplifiers," Optics Express, vol. 19, No. 14, Jul. 4, 2011, pp. 13218-13224. http://www.opticsinfobase.org/abstract.cfm?URI=oe-19-14-13218.

F. Stutzki, H.-J. Otto, F. Jansen, C. Gaida, C. Jauregui, J. Limpert, and A. Tünnermann, "High-speed modal decomposition of mode instabilities in high-power fiber lasers," Optics Letters, vol. 36, No. 23, Dec. 1, 2011, pp. 4572-4574. http://www.opticsinfobase.org/abstract.cfm?URI=ol-36-23-4572.

H.-J. Otto, F. Stutzki, F. Jansen, T. Eidam, C. Jauregui, J. Limpert, and A. Tünnerman, "Temporal dynamics of mode-instabilities in high power fiber lasers and amplifiers," Optics Express, vol. 20, No. 14, Jul. 2, 2012, pp. 15710-15722.

C. Jauregui, T. Eidam, J. Limpert and A. Tünnermann, "Impact of modal interference on the beam quality of high-power fiber amplifiers," Optics Express, vol. 19, No. 4, Feb. 14, 2011, pp. 3258-3271. http://www.opticsinfobase.org/abstract.cfm?URI=oe-19-4-3258.

A. A. Fotiadi, O. L. Antipov and P. Megret, "Resonantly Induced Refractive Index Changes in Yb-Doped Fibers: the Origin, Properties and Application for all-fiber Coherent Beam Combining," Frontiers in Guided Wave Optics and Optoelectronics, (2010), pp. 209-234.

J. Limpert, F. Stutzki, F. Jansen, H.-J. Otto, T. Eidam, C. Jauregui, and A. Tünnermann, "Yb-doped large-pitch fibres: effective single-mode operation based on higher-order mode delocalisation," Light: Science & Applications (2012), 1, e8, pp. 1-5.

T. Eidam, S. Hädrich, F. Jansen, F. Stutzki, J. Rothhardt, H. Carstens, C. Jauregui, J. Limpert, and A. Tünnermann, "Preferential gain photonic-crystal fiber for mode stabilization at high average powers.," Optics Express, vol. 19, No. 9, Apr. 25, 2011, pp. 8656-8661.

A. V. Smith and J. J. Smith, "Increasing mode instability thresholds of fiber amplifiers by gain saturation," Optics Express, vol. 21, No. 13, Jul. 1, 2013, pp. 15168-15182.

C. Jauregui, H.-J. Otto, F. Stutzki, F. Jansen, J. Limpert, and A. Tünnermann, "Passive mitigation strategies for mode instabilities in high-power fiber laser systems," Optics Express, vol. 21, No. 16, Aug. 12, 2013, pp. 19375-19386.

C. Jauregui, H.-J. Otto, S. Breitkopf, J. Limpert, and A. Tünnermann, "Optimizing high-power Yb-doped fiber amplifier systems in the presence of transverse mode instabilities," Optics Express, vol. 24, No. 8, Apr. 18, 2016, pp. 7879-7892.

H.-J. Otto, C. Jauregui, F. Stutzki, F. Jansen, J. Limpert, and A. Tünnermann, "Controlling mode instabilities by dynamic mode excitation with an acousto-optic deflector.," Optics Express, vol. 21, No. 14, Jul. 15, 2013, pp. 17285-17298.

Eznaveh et al., "Bi-directional pump configuration for increasing thermal modal instabilities threshold in high power fiber amplifiers", Proc. of SPIE vol. 9344, pp. 93442G-1-93442G-5, 2015.

Jauregui et al., "Physical origin of mode instabilities in high-power fiber laser system", Optics Express, vol. 20, No. 12, pp. 12912-12925, Jun. 4, 2012.

Haarlammert et al., "Build up and decay of mode instability in a high power fiber amplifier", Optics Express, vol. 20, No. 12, pp. 13274-13283, Jun. 4, 2012.

Smith et al., "Influence of signal bandwidth on mode instability thresholds of fiber amplifiers", Proc. of SPIE, vol. 9344, pp. 93440L-1-93440L-8, 2015.

Smith et al., "Influence of pump and seed modulation on the mode instability threshold of fiber amplifiers", Optics Express, vol. 20, No. 22, pp. 24545-24558, Oct. 22, 2012.

Stihler et al., Controlling mode instabilities at 628 W average output power in an Yb-doped rod-type fiber amplifier by active modulation of the pump power, Proc. of SPIE, vol. 10083, pp. 100830P-1-100830P-5, 2017.

Ward et al., "Origin of thermal modal instabilities in large mode area fiber amplifiers", Optics Express, vol. 20, No. 10, pp. 11407-11422, May 7, 2012.

\* cited by examiner

ACTIVE STABILIZATION OF MODE INSTABILITIES IN OPTICAL WAVEGUIDES

CROSS REFERENCE TO RELATED APPLICATIONS

This application is a non-provisional application that hereby claims priority under 35 U.S.C. 119(e) from U.S. Provisional Patent Application Ser. No. 62/362,683 filed Jul. 15, 2016, the disclosure of which is incorporated herein by reference.

FIELD OF THE INVENTION

The invention relates to a method of propagating a laser signal through an optical waveguide. Moreover, the invention relates to a waveguide laser system.

BACKGROUND OF THE INVENTION

Due to the impressive development of fiber laser technology in recent years [1], optical fibers have earned a solid reputation as a highly power scalable laser concept. This unparalleled progress, that has seen laser systems evolve from low power setups to multi-kW industrial systems in about a decade, has much to do with the extremely high-power handling capability offered by the geometry of the fiber. The very high surface to active volume ratio allows for an efficient heat removal and, therefore, for high-power operation. However, even though the geometry of the fiber relaxes the demands on thermal management, it generates other problems. Thus, the tight confinement of the light in the core of the fiber gives rise to high intensities that interact with the fiber material over long lengths, which increases the impact of non-linear effects. Hence, active fibers for high-power operation (especially in pulsed operation) have to be specifically designed to alleviate the adverse consequences derived from the non-linearity of the material. The most effective way of mitigating non-linear effects in active fibers is to enlarge the core. This results in a two-fold advantage: on the one hand it reduces the intensity of the light propagating in the fiber core and, on the other hand, in double-clad fibers if the pump cladding diameter is not changed, it increases the pump absorption, which allows for shorter devices, thus further mitigating the impact of non-linear effects. Unfortunately, realizing fibers with large cores that still support single-mode operation is far from trivial, especially for high-power operation. In fact, even though the most advanced fiber designs have some in-built mechanism of mode discrimination [2-3], fibers with mode-field diameters larger than 50 µm typically support the propagation of a few modes. Consequently, in high-power fiber laser systems today the combination of high thermal loads with few-mode operation is to be found for the first time [4]. This can potentially give rise to new phenomena such as the recently observed onset of mode instabilities at high average powers [5].

The phenomenon of mode instabilities refers to the output beam of a fiber laser system becoming suddenly unstable once that a certain output power threshold has been reached. Thus, it can be observed that with only a small increase of the output power, the once Gaussian-like output beam of the fiber starts to fluctuate. In this regime the intensity profile at the output of the fiber shows a constantly changing beam formed by the coherent superposition of the fundamental mode and one or more higher-order modes [6]. Recent measurements with a high-speed camera have confirmed that there is actually energy transfer between the fundamental mode and the higher-order mode [7]. Furthermore, Fourier analysis of the beam fluctuations has revealed that, near the threshold, these are not random but follow quasi-periodic patterns with well-defined frequencies [8]. However, when increasing the power further, the beam fluctuations seem to become chaotic.

Shortly after the first reports of this effect came out, the first hypothesis on the origin of the effect was published [9]. In this explanation the interference pattern that appears along a fiber due to the beating of two transverse modes gives rise to a long period index grating via the thermo-optic effect or the resonantly enhanced non-linearity of active fibers [10]. Even though this theory could not explain the dynamic behavior of mode instabilities, it provided an explanation for the mechanism responsible for the energy transfer between two orthogonal transverse modes.

Over the last years several mitigation strategies for mode instabilities have been proposed, demonstrated and/or patented. Some of these rely on the delocalization of higher-order modes [11], on exploiting fiber designs with confined-doping [12], on using gain saturation [13], on reducing the quantum defect in the laser system [14] or on reducing the laser-active-ion concentration in the fiber core [15], just to name a few. Most of the mitigation strategies proposed up to now for mode instabilities are passive ones, i.e. they do not require any external feedback loop to operate. There is, however, an already experimentally demonstrated way of actively stabilizing a fluctuating beam above the mode instability threshold using an acousto-optic deflector [16]. The idea hereby was to dynamically change the coupling conditions in the fiber to wash-out the thermally-induced index grating responsible for mode instabilities. Using this technique a beam could be stabilized at powers that were 4 times higher than the original mode instability threshold.

SUMMARY OF THE INVENTION

The invention discloses a novel way of stabilizing the beam emitted by a fiber laser system above the mode instability threshold.

According to the invention, a method of propagating a laser signal through an optical waveguide is disclosed, wherein the beat length of two or more interfering transverse modes of the laser signal in the optical waveguide is modulated in time.

Preferably, the frequency of the modulation of the beat length is close to the inverse of the thermalization time of a core of the optical waveguide. For example, the frequency of the modulation of the beat length is close to the time of fluctuations of the laser beam observed at the output of the optical waveguide. Preferably, the modulation frequency is below 100 kHz, more preferably below 10 kHz.

In an embodiment of the invention, the optical waveguide is optically active and is optically pumped to amplify the laser signal while propagating through the optical waveguide. In this embodiment, the modulation of the beat length of the transverse modes may be achieved by modulating the pump power. Preferably, at least two pump sources are used, wherein the pump radiation of one of the pump sources propagates in the co-propagating direction and the pump radiation of another one of the pump sources propagates in the counter-propagating direction with respect to the laser signal through the optical waveguide. In this case, the modulation of the pump power of the pump sources may advantageously be synchronized to obtain a constant power of the laser signal at the output of the optical waveguide. The optical waveguide may be doped with rare-earth ions.

Alternatively, the modulation of the beat length of the transverse modes may be achieved by modulating the power of the laser signal coupled into the optical waveguide.

According to yet another embodiment, a modulated auxiliary signal may be coupled into the optical waveguide in addition to the laser signal, wherein the wavelength of the auxiliary signal falls within the amplification bandwidth of the optical waveguide.

The optical waveguide may comprise an absorbing material which is illuminated by an external modulated radiation source at an absorption wavelength of the absorbing material, wherein the absorption wavelength is outside of the pump absorption bands and amplification bands of the optical waveguide. In a possible embodiment, the absorbing material may be the host material of the optical waveguide itself.

According to a further embodiment, two or more electrodes may be incorporated into the optical waveguide, wherein a modulated voltage is applied to the electrodes to dynamically modify the refractive index profile of the optical waveguide via electrostriction.

Preferably, according to the invention, the amplitude, frequency, and/or temporal shape of the modulation of the beat length of the transverse modes is controlled by a feedback loop which monitors the laser signal at the output of the optical waveguide.

Furthermore, the invention discloses a waveguide laser system comprising an optical waveguide, through which a laser signal is propagated, and a modulator, which modulates the beat length of two or more transverse modes of the laser signal in the optical waveguide. The modulator may be any means configured to modulate the beat length of the transverse modes in accordance with the method of the invention described herein above and in the following.

BRIEF DESCRIPTION OF THE DRAWINGS

The enclosed drawings disclose preferred embodiments of the present invention. It should be understood, however, that the drawings are designed for the purpose of illustration only and not as a definition of the limits of the invention. In the drawings.

DETAILED DESCRIPTION OF THE EMBODIMENTS

Figure 1:
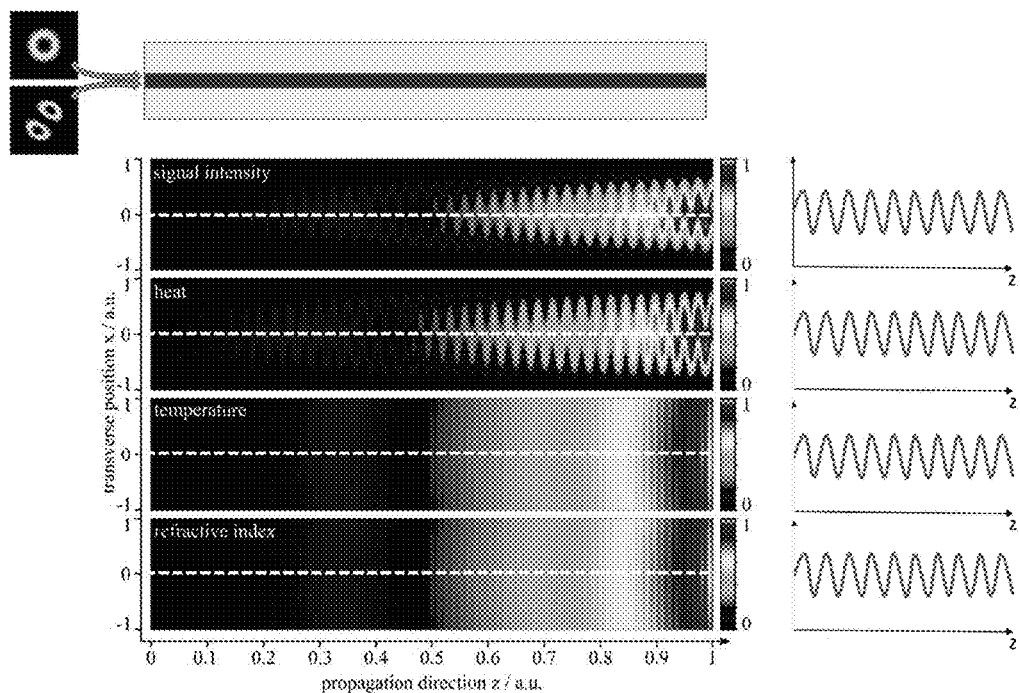
FIG. 1 shows a schematic illustration of the origin of mode instabilities.

As schematically illustrated in FIG. 1, when two transverse modes are simultaneously excited in an optical fiber (constituting an optical waveguide within the meaning of the invention), they propagate giving rise to a three dimensional interference intensity pattern. This, in turn, gets imprinted in the inversion profile generating a heat load that mimics the interference pattern. Such situation results in a temperature profile with periodic features in it that, via the thermo-optic effect, is translated into a quasi-periodic refractive index change, i.e. a thermally-induced index grating. Such grating has characteristics in terms of symmetry and periodicity to potentially transfer energy between the interfering modes, thus giving rise to the observed phenomenon of mode instabilities. For the sake of simplicity, the three dimensional patterns (intensity, inversion, heat-load, temperature and index change) will be represented in the following by their projections along the axis of the fiber (dashed lines in FIG. 1), thus reducing them to two-dimensional functions (which in the simplest case will resemble a sinusoidal function).

Figure 2:
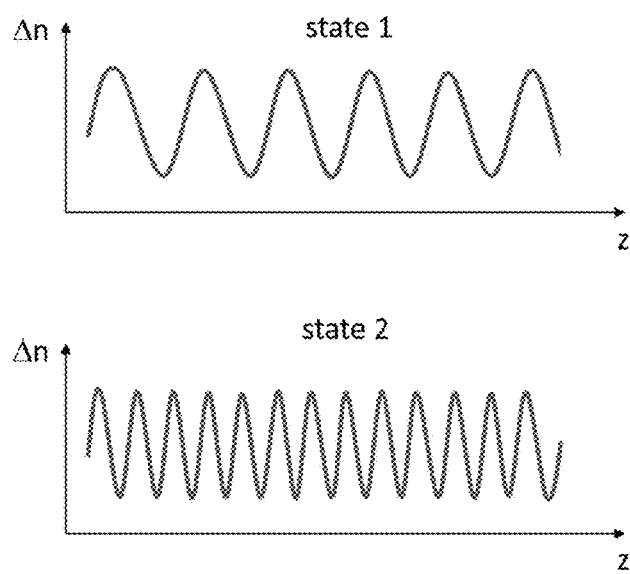
FIG. 2 shows schematically the impact that changing the beat length of the fiber modes between two states (state 1 and 2) has on the thermally-induced index grating ($\Delta n$)

It is important to realize that the period of the thermally-induced index grating at each point along the fiber is determined by the local beat length between the interfering fiber modes. Thus, as schematically illustrated in FIG. 2, by changing this beat length (i.e the period of the modal interference intensity pattern), it will be possible to influence the thermally-induced index grating (represented by $\Delta n$ in FIG. 2). However, the index grating $\Delta n$ requires a certain time (related to the thermalization time in the fiber core) to adapt itself to the new situation (i.e. heat-load). This reaction time is approximately given by the inverse of the frequency of the beam fluctuations during the instabilities, and it can be roughly estimated by the thermalization time in a rod geometry:

$$\tau_{th} = \frac{C \cdot \rho \cdot MFD^2}{4\kappa}$$

where C is the heat capacity, $\rho$ is the density and $\kappa$ is the thermal conductivity of the core material. Additionally MFD represents the mode field diameter of the light in the fiber. Depending on the size, and according to the formula given above, the fluctuations of mode instabilities have a characteristic frequency <100 kHz, even though for the conventional fibers used in high average power systems this frequency is usually <10 kHz.

Figure 3:
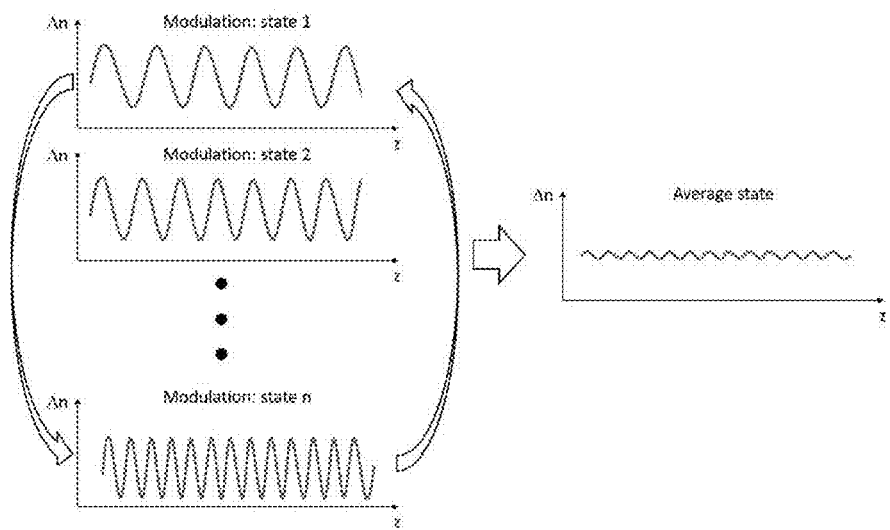
FIG. 3 illustrates the impact of a dynamic modulation of the beat length at a frequency similar to that of the beam fluctuations during mode instabilities.

As indicated in FIG. 3, if, once that the mode instability threshold has been reached, the beat length of the fiber is modulated with a frequency close to that of the beam fluctuations of the free-running system, the thermally induced index grating $\Delta n$ will not be able to fully adapt itself to the changing situation. As a consequence it will adopt a profile that is the superposition of the different states forced by the modulation. In other words, the thermally-induced index grating will be washed out. Hereby, the ability of the grating to transfer energy between the fiber modes will be weakened and the beam will be stabilized.

The beat length $L_b$ of two fiber modes is given by:

$$L_b = \frac{\lambda}{n_{eff1} - n_{eff2}}$$

Where λ is the wavelength of the signal and $n_{eff,i}$ represents the effective refractive index of the $i^{th}$ mode. Therefore, in order to modulate the beat length for a constant signal wavelength according to the invention, it is necessary to change the difference between the effective refractive indexes of the fiber modes. There are several ways to accomplish this, which corresponds to different embodiments of this invention. These will be detailed in the following.

Figure 4:
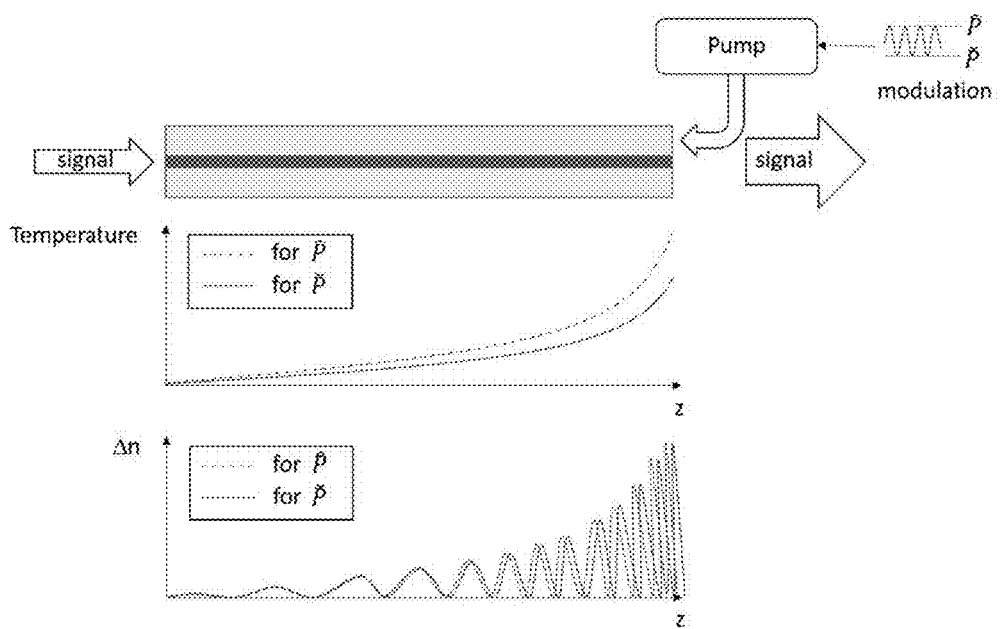
FIG. 4 shows the impact of a dynamic modulation of the pump power of a fiber laser system on the longitudinal temperature gradient and on the thermally-induced index grating.

The beat length of two fiber modes depends on the temperature gradient of the fiber, which may be controlled by the pump power. As illustrated in FIG. 4, if the pump power is modulated (having a highest power level of $\bar{P}$ and a lowest power level of $\underline{P}$), the temperature distribution along the fiber can be changed. Since the beat length of the modes in a fiber is usually shorter the higher the temperature (or, more correctly, the higher the transverse temperature gradient), modulating the pump power has the effect of also changing the beat length along the fiber. However, since in a real active fiber there is usually a longitudinal temperature gradient, the beat length for any given pump power is not constant along the waveguide which, as illustrated at the bottom of FIG. 4, results in a thermally-induced index grating that is not homogeneous along the fiber length. In spite of this, modulating the pump power still has the desired effect of shifting the maxima and minima of the thermally-induced index grating in the axial direction of the fiber. This, when done at the proper modulation frequency, will result in an equilibrium state with a significantly weaker thermally-induced grating and, correspondingly, less mode instabilities.

This approach has the advantage of an easy and convenient integration in existing fiber laser systems, which makes it very attractive from the practical point of view. The drawback, however, is that the pump modulation will be translated into a modulation of the output power of the fiber system. This modulation will usually be in the range of some 100 Hz to a few kHz (typically below 10 kHz). Whereas such a fast modulation will not be noticeable for many application, there are some that are definitively sensitive to it. Therefore, in order to solve this potentially detrimental side-effect of the proposed embodiment of the invention, it is suggested by the invention to use at least two modulated pump sources (which, without any loss of generality may have different wavelengths): with at least one in the co-propagating direction and at least one in the counter-propagating direction (with respect to the laser signal propagating in the fiber). In the easiest implementation, these pump sources will emit exactly the same average power. The modulation of these two pump sources should be synchronized and have a π-phase shift relative to each another. This implementation results in a longitudinal shift of the maxima and minima of the thermally-induced index grating without any power fluctuation of the output signal.

In a different embodiment, the modulation of the beat length of the fiber modes can be achieved by modulating the seed signal power, i.e. the power of the laser signal propagating through the fiber. This, when choosing the correct parameters in terms of modulation amplitude, frequency and function, will lead to similar stabilization results as those obtained with the modulation of the pump power. This approach has the same disadvantage as the one described previously, that is: the output signal power will fluctuate at a frequency corresponding to the modulation. In order to prevent this from happening, both approaches can be combined. In this way it becomes possible to realize a fiber system which is end-pumped only from one side with a modulated pump and which is seeded by a modulated (seed) laser signal. By choosing the right modulation parameters for both the signal and the pump (usually this will lead to using the same modulation frequency and a π-phase shift between the modulation patterns of signal and pump), it is possible to stabilize mode instabilities and to obtain a signal at the output which shows no power fluctuations.

In yet another embodiment of the invention, it is possible to inject a secondary auxiliary signal into the system, which will have a different wavelength from that of the main "useful" laser signal and which is modulated. In the preferred embodiment, the wavelength of this auxiliary signal will fall within the amplification bandwidth of the fiber system. Again, the modulation of this auxiliary signal with the right parameters will lead to a weakening of the thermally-induced index grating and to a stabilization of mode instabilities. As before, this embodiment can be combined with any of the previous ones to obtain a stabilized beam with no power fluctuations at the output.

Figure 5:
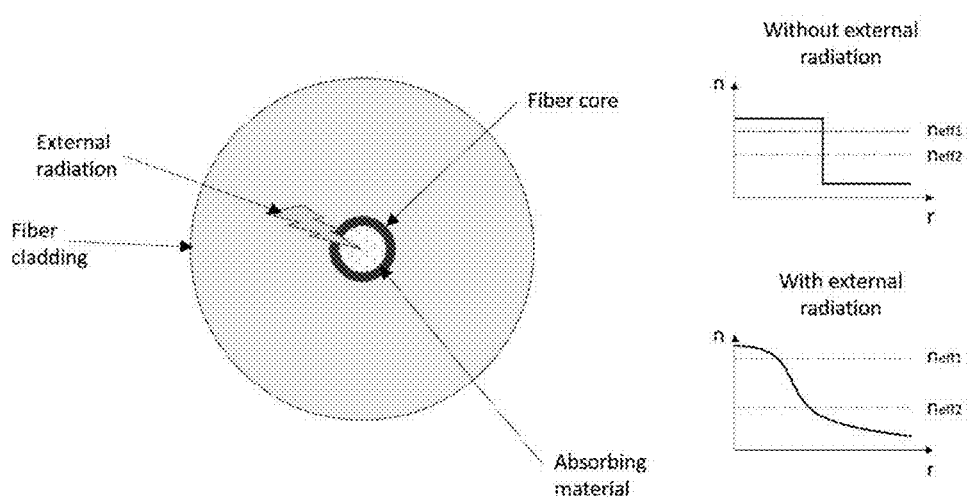
FIG. 5 schematically illustrates the impact of the absorption of an external radiation in an absorbing region of the fiber.

Another way of changing the beat length of two modes in a fiber is by generating heat inside of the waveguide. Such an internal heat source leads to a change of the refractive index profile of the fiber which, in turn, results in a modification of the effective refractive indexes of the fiber modes and, therefore, of their beat length. One way of modulating the internal heat generated in a fiber is by incorporating an absorbing medium into the optical waveguide and by illuminating it by an external radiation source (usually, but not necessarily, light) which has a wavelength that is outside the pump absorption and gain bands of the fiber. This is schematically illustrated in FIG. 5. Following this approach, a modulation of the external radiation will lead to a modulation of the modal beat length in the fiber and, as explained above, when done with the right frequency, to a weakening of the thermally-induced index grating.

A particularly simple embodiment of this approach is to use the host material optical fibers are made of (usually silica) as the absorbing material. Thus, in the case of silica, the OH absorption peaks situated around 1400 nm or 2000 nm could be used. Likewise, the silica fiber can be irradiated by an external radiation source emitting at a wavelength longer than the transparency edge of silica (located around 2.2 μm). By doing so and by performing a transversally inhomogeneous illumination of the fiber with the external radiation (e.g. concentrating this radiation exclusively in the fiber core), it will be possible to generate an extra heat source in the fiber that controls the beat length of the fiber modes.

Another simple embodiment of this approach, particularly useful in Yb-doped fibers, exploits the photo-darkening effect in these kind of systems. Photo-darkening is an effect by which a photo-degradation of the fiber is observed, which manifests itself in the appearance of strong absorption peaks in the visible part of the electromagnetic spectrum. Thus, these peaks can be used to generate heat in the fiber by illuminating it with radiation between 300-700 nm. The advantage of this embodiment is that the absorption peaks only appear in the fiber regions doped with Yb, which automatically leads to the generation of a transversally inhomogeneous heat load and, therefore, to the modification of the beat length even if the whole fiber is illuminated with the external radiation.

Even though the absorbing material has been considered to be located in the core of the fiber in the examples discussed above, in general it can be placed anywhere in the fiber (related to both its cross-section and its length). Placing this absorbing material outside of the core might be advantageous since it may allow, for example, injecting the external radiation to be absorbed from the side of the fiber, i.e. transversally to the fiber axis. Placing the absorbing material in the cladding can be particularly effective in waveguide designs which effective single-mode operation is based on the concept of delocalization. In these waveguide the inner structure results in the higher-order modes having most of their energy located outside of the central core. In such a situation these modes are extremely sensitive to changes in the cladding portion of the waveguide and, therefore, modulating the heat load there can lead to strong changes of the modal beat length and, ultimately, to the stabilization of the beam fluctuations above the mode instability threshold.

Figure 6:
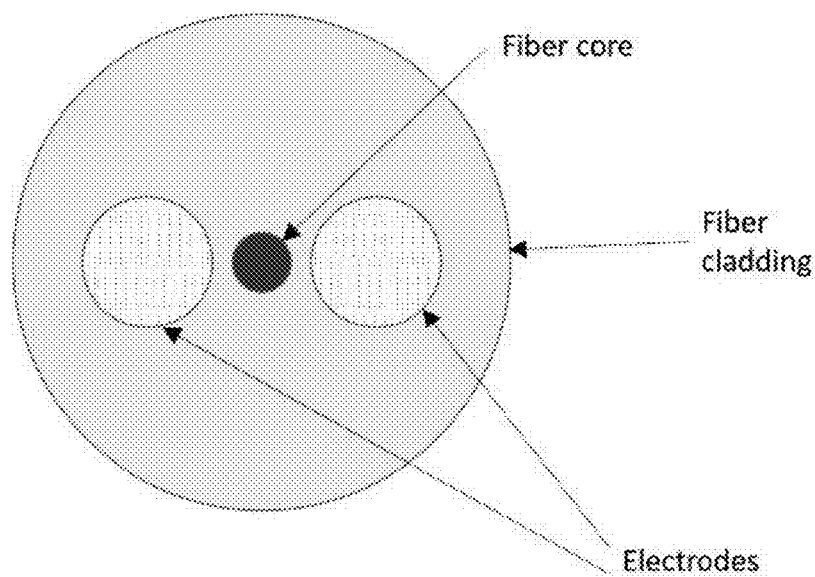
FIG. 6 shows a cross section of a fiber containing two electrodes used to modulate the transverse index profile of the fiber.

Yet another approach to change the beat length of the fiber modes is the direct modification of the refractive index profile of the fiber. A possible embodiment of this idea is, as schematically shown in FIG. 6, to incorporate two or more electrodes in the cross-section of the fiber outside of the fiber core. Then, by applying a voltage difference between the electrodes, an electric field is created that, through electrostriction, can lead to the change of the index profile of the fiber. A modulation of this electrical signal can, then, result in a modulation of the beat length of the modes and, in turn, to a weakening of the thermally-induced grating.

Figure 7:
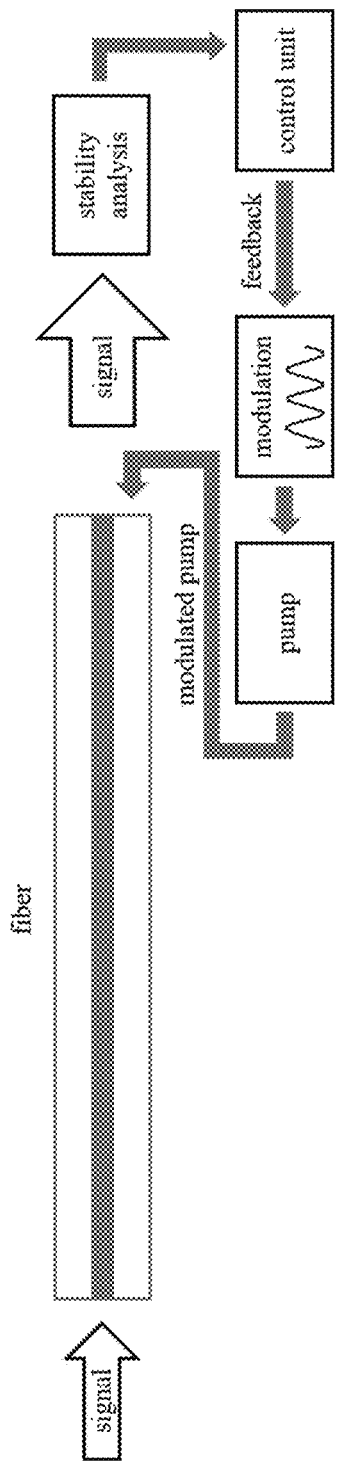
FIG. 7 schematically illustrates the incorporation of a feedback control loop to achieve a long term stabilization of the beam fluctuations using the embodiment with the modulation of the pump power.

Regardless of the particular embodiment, a feedback control loop should be used that analyzes the stability of the output laser signal and adjusts the frequency, amplitude and modulation function to adapt itself to possible drifts of the system. This approach is exemplarily illustrated in FIG. 7, for the embodiment in which the pump power is modulated.

Even though most of the embodiments described above will typically be realized with rare-earth doped fibers as optical waveguides, the embodiments can also be applied to fiber amplifiers based on inelastic scattering (Brillouin and Raman) or on parametric processes (such as four-wave mixing).

REFERENCES

[1] D. J. Richardson, J. Nilsson, and W. A. Clarkson, "High power fiber lasers: current status and future perspectives [Invited]," J. Opt. Soc. Am. B 27, B63-B92 (2010), http://www.opticsinfobase.org/abstract.cfm?URI=josab-27-11-B63.

[2] F. Stutzki, F. Jansen, T. Eidam, A. Steinmetz, C. Jauregui, J. Limpert, and A. Tünnermann, "High average power large-pitch fiber amplifier with robust single-mode operation," Opt. Lett. 36, 689-691 (2011), http://www.opticsinfobase.org/abstract.cfm?URI=ol-36-5-689.

[3] C. Liu, G. Chang, N. Litchinitser, A. Galvanauskas, D. Guertin, N. Jabobson, and K. Tankala, "Effectively Single-Mode Chirally-Coupled Core Fiber," in *Advanced Solid-State Photonics*, OSA Technical Digest Series (CD) (Optical Society of America, 2007), paper ME2. http://www.opticsinfobase.org/abstract.cfm?URI=ASSP-2007-ME2

[4] F. Jansen, F. Stutzki, H.-J. Otto, T. Eidam, A. Liem, C. Jauregui, J. Limpert, and A. Tünnermann, "Thermally induced waveguide changes in active fibers," Opt. Express 20, 3997-4008 (2012), http://www.opticsinfobase.org/oe/abstract.cfm?URI=oe-20-4-3997

[5] T. Eidam, S. Hanf, E. Seise, T. V. Andersen, T. Gabler, C. Wirth, T. Schreiber, J. Limpert, and A. Tünnermann, "Femtosecond fiber CPA system emitting 830 W average output power," Opt. Lett. 35, 94-96 (2010), http://www.opticsinfobase.org/abstract.cfm?URI=oi-35-2-94

[6] T. Eidam, C. Wirth, C. Jauregui, F. Stutzki, F. Jansen, H.-J. Otto, O. Schmidt, T. Schreiber, J. Limpert, and A. Tünnermann, "Experimental observations of the threshold-like onset of mode instabilities in high power fiber amplifiers," Opt. Express 19, 13218-13224 (2011), http://www.opticsinfobase.org/abstract.cfm?URI=oe-19-14-13218

[7] F. Stutzki, H.-J. Otto, F. Jansen, C. Gaida, C. Jauregui, J. Limpert, and A. Tünnermann, "High-speed modal decomposition of mode instabilities in high-power fiber lasers," Opt. Lett. 36, 4572-4574 (2011), http://www.opticsinfobase.org/abstract.cfm?URI=oi-36-23-4572

[8] H.-J. Otto, F. Stutzki, F. Jansen, T. Eidam, C. Jauregui, J. Limpert, and A. Tünnerman, "Temporal dynamics of mode-instabilities in high power fiber lasers and amplifiers," Opt. Express (submitted)

[9] C. Jauregui, T. Eidam, J. Limpert, and A. Tünnermann, "The impact of modal interference on the beam quality of high-power fiber amplifiers," Opt. Express 19, 3258-3271 (2011), http://www.opticsinfobase.org/abstract.cfm?URI=oe-19-4-3258

[10] A. A. Fotiadi, O. L. Antipov and P. Megret, "Resonantly Induced Refractive Index Changes in Yb-Doped Fibers: The Origin, Properties and Application for all-fiber Coherent Beam Combining," Frontiers in Guided Wave Optics and Optoelectronics, 209-234 (2010).

[11] J. Limpert, F. Stutzki, F. Jansen, H.-J. Otto, T. Eidam, C. Jauregui, and A. Tünnermann, "Yb-doped large-pitch fibres: effective single-mode operation based on higher-order mode delocalisation," Light Sci. Appl. 1, e8 (2012).

[12] T. Eidam, S. Hädrich, F. Jansen, F. Stutzki, J. Rothhardt, H. Carstens, C. Jauregui, J. Limpert, and A. Tünnermann, "Preferential gain photonic-crystal fiber for mode stabilization at high average powers.," Opt. Express 19, 8656-8661 (2011).

[13] A. V. Smith and J. J. Smith, "Increasing mode instability thresholds of fiber amplifiers by gain saturation," Opt. Express 21, 15168 (2013).

[14] C. Jauregui, H.-J. Otto, F. Stutzki, F. Jansen, J. Limpert, and A. Tünnermann, "Passive mitigation strategies for mode instabilities in high-power fiber laser systems," Opt. Express 21, 19375-19386 (2013).

[15] C. Jauregui, H.-J. Otto, S. Breitkopf, J. Limpert, and A. Tünnermann, "Optimizing high-power Yb-doped fiber amplifier systems in the presence of transverse mode instabilities," Opt. Express 24, 7879 (2016).

[16] H.-J. Otto, C. Jauregui, F. Stutzki, F. Jansen, J. Limpert, and A. Tünnermann, "Controlling mode instabilities by dynamic mode excitation with an acousto-optic deflector.," Opt. Express 21, 17285-98 (2013).

What is claimed is:

1. A method of propagating a laser signal through an optical waveguide, wherein a beat length of two or more transverse modes of the laser signal in the optical waveguide is modulated and wherein an amplitude, a frequency, and/or a temporal shape of the modulation of the beat length of the transverse modes is controlled by a feedback loop which monitors the laser signal at an output of the optical waveguide.

2. The method of claim 1, wherein the beat length is modulated with a frequency below 100 kHz.

3. The method of claim 1, wherein the beat length of the transverse modes is modulated with a frequency below 10 kHz.

4. The method of claim 1, wherein the optical waveguide is optically active and is optically pumped to amplify the laser signal while propagating through the optical waveguide.

5. The method of claim 4, wherein the modulation of the beat length of the transverse modes is achieved by modulating a pump power.

6. The method of claim 5, wherein at least two pump sources are used, wherein a pump radiation of one of the pump sources propagates in a co-propagating direction and the pump radiation of another one of the pump sources propagates in a counter-propagating direction with respect to the laser signal through the optical waveguide.

7. The method of claim 6, wherein the modulation of the pump power of the pump sources is synchronized to achieve a constant power of the laser signal at an output of the optical waveguide.

8. The method of claim 4, wherein the modulation of the beat length of the transverse modes is achieved by modulating the power of the laser signal coupled into the optical waveguide.

9. The method of claim 4, wherein a modulated auxiliary signal is coupled into the optical waveguide in addition to the laser signal, wherein the wavelength of the auxiliary signal falls within the amplification bandwidth of the optical waveguide.

10. The method of claim 4, wherein the optical waveguide comprises an absorbing material which is illuminated by an external modulated radiation source at an absorption wavelength of the absorbing material, wherein the absorption wavelength is outside of the pump absorption bands and amplification bands of the optical waveguide.

11. The method of claim 10, wherein the absorbing material is the host material of the optical waveguide.

12. The method of claim 1, wherein two or more electrodes are incorporated into the optical waveguide, wherein a modulated voltage is applied to the electrodes to dynamically modify the refractive index profile of the optical waveguide via electrostriction.

13. The method of claim 1, wherein the optical waveguide is doped with rare-earth ions.

* * * * *